United States Patent [19]

May, Jr.

[11] 3,747,601

[45] July 24, 1973

[54] WOVEN, FOLDED, REUSABLE ABSORBENT PRODUCTS AND METHODS OF MAKING THE SAME

[76] Inventor: Winston L. May, Jr., 982 Ponus Ridge, New Canaan, Conn.

[22] Filed: Apr. 19, 1971

[21] Appl. No.: 135,291

[52] U.S. Cl. .............................................. 128/284
[51] Int. Cl. .............................................. A61f 13/16
[58] Field of Search ................................... 128/284

[56] References Cited
UNITED STATES PATENTS

| | | | |
|---|---|---|---|
| 3,109,428 | 11/1963 | Jamison | 128/284 |
| 3,291,162 | 12/1966 | Jamison | 128/284 |
| 3,367,333 | 2/1968 | Scheier | 128/284 |
| 3,409,012 | 11/1968 | Seltzer | 128/284 |
| 3,602,224 | 8/1971 | Abee et al. | 128/284 |

*Primary Examiner*—Charles F. Rosenbaum
*Attorney*—Edward Taylor Newton, George M. Hopkins and William J. Ormsby, Jr.

[57] ABSTRACT

Woven, folded, reusable absorbent products such as diapers, panty pads, surgical dressings, general use sponges and pads, compresses, and the like, comprising a plurality of interior layers and outer layers, the interior layers comprising multi-ply, highly absorbent fabric layers, preferably of gauze, and the outer layers comprising single-ply, stronger, more abrasion resistant, longer-wearing, fabric layers, preferably of birdseye, all of the layers being integrally fabricated at the same time in a single weaving operation and subsequently folded, as desired or required. Methods of making such absorbent products are also involved.

11 Claims, 28 Drawing Figures

Patented July 24, 1973

INVENTOR
WINSTON L. MAY, JR.
BY
*Alexander T Kardos*
ATTORNEY

Patented July 24, 1973

INVENTOR
WINSTON L. MAY, JR.
BY
ATTORNEY

Patented July 24, 1973  3,747,601

INVENTOR
WINSTON L. MAY, JR.
BY
ATTORNEY

Patented July 24, 1973

FILLING DIRECTION →

INVENTOR
WINSTON L. MAY, JR.
BY
Alexander T. Kardos
ATTORNEY

WOVEN, FOLDED, REUSABLE ABSORBENT PRODUCTS AND METHODS OF MAKING THE SAME

BACKGROUND OF THE INVENTION

Woven, reusable absorbent products, such as diapers, panty pads, surgical dressings, general use sponges and pads, compresses, and the like, have been made for many years for absorbing fluids, semi-fluids and semi-solids and there are many satisfactory, commercially acceptable absorbent products on the market. However, it is always desirable to make such absorbent products even more satisfactory and even more commerically acceptable.

These woven, reusable absorbent products are customarily woven in a variety of patterns and styles of weaves, and each weave has its own advantages and benefits, as well as disadvantages and limitations. Woven gauze fabrics, for example, have a generally open construction and loose weave and are greatly used because of their relatively high absorbent properties. However, it has always been desired that these woven gauze fabrics be stronger, and that they have greater wear- and abrasion-resistance and thus have a longer service life and longer wearing properties. Woven birdseye fabrics, on the other hand, are more tightly woven and have a closer construction and are greatly used because of their relatively high strength, greater abrasion resistance, longer service life, and longer wearing properties. However, they normally do not have the absorbency of gauze fabrics.

OBJECTS OF THE INVENTION

It is a primary object of the present inventive concept to provide woven, folded reusable absorbent products which will possess excellent absorbency for fluids, semi-fluids and semi-solids, along with excellent strength, high wear and abrasion resistance, long service life, and long wearing properties.

THE INVENTIVE CONCEPT

It has been discovered that woven, folded, reusable absorbent products having such very desirable properties may be obtained by fabricating materials at the same time in a single weaving operation whereby they possess multiply, highly absorbent fabric sections or portions, preferably of gauze, and birdseye single-ply, stronger, more abrasion resistant, longer wearing fabric sections or portions, preferably of birdseye, arranged in such a way normally across the width or filling direction of the woven fabric that it is possible to fold the woven fabric in such a way that the more highly absorbent, multi-ply portions are folded within the folded product as interior layers and the stronger, more highly wear and abrasion resistant, single-ply portions with longer wearing properties remain on the outside of the folded product as outer layers. As a result, the advantages and benefits of both styles of weaves are fully realized without suffering their disadvantages and limitations.

In the following specification and accompanying drawings, there are described and illustrated preferred embodiments of the invention but it is to be understood that the inventive concept is not to be considered limited to the specific embodiments disclosed except as determined by the scope of the appended claims. Referring to the accompanying drawings:

THE WOVEN BLANK

Figure 1:
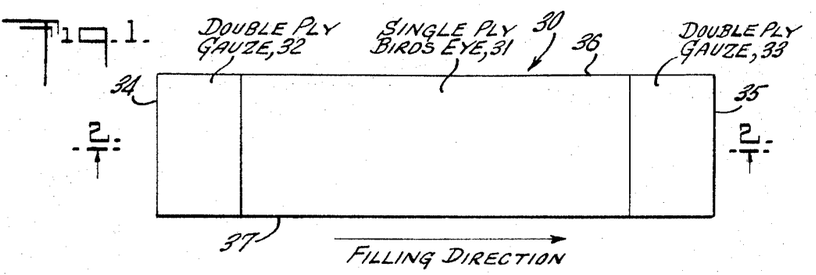
FIG. 1 is a schematic plan view of a woven fabric blank suitable for folding into an improved absorbent product embodying the principles of the present inventive concept.
Figure 2:
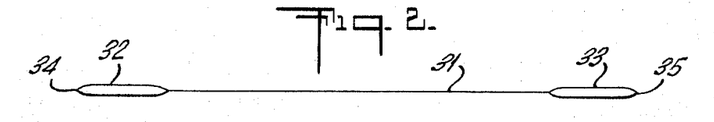
FIG. 2 is a schematic cross-sectional view of the woven fabric blank of FIG. 1, taken on the line 2—2 thereof.

In the drawings, and with particular reference to FIGS. 1 and 2, there is schematically shown a woven fabric blank 30 which is a unitary, integral structure comprising a centrally located, single-ply birdseye fabric portion 31, two double-ply gauze fabric portions 32 and 33 located adjacent and contacting the single-ply birdseye fabric portion and located at the sides of the woven blank 30, two conventional selvages 34 and 35 at the side edges of the woven blank 30, and two conventional pinking bar portions 36 and 37, extending across the width of the woven blank in the filling direction.

These woven blanks 30 are, of course, integrally fabricated in a single weaving operation wherein a common filling yarn is passed through the entire width of the fabric and is thus interwoven with all the warp yarns. The gauze portion and the birdseye portion are thus integral and form a unitary structure. As initially woven in a loom, the fabric comprises a very great length of a very large number of connected woven blanks 30 joined by the pinking bar portions. Cutting along the center lines of these pinking bar portions separates the great length of woven materials into individual woven blanks 30.

Figures 3, 4:
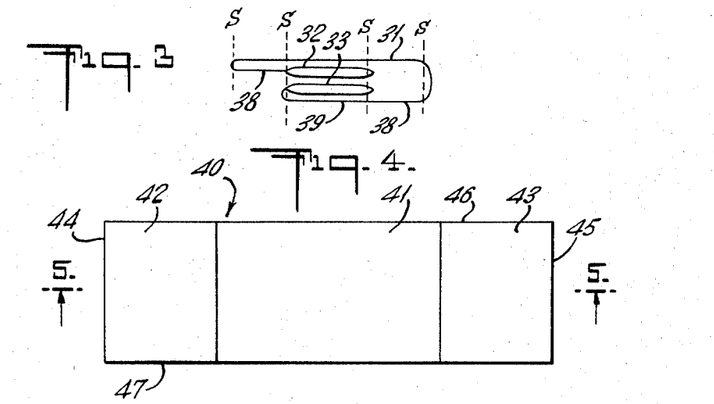
FIG. 3 is a schematic cross-sectional view of the woven fabric blank of FIG. 2, after it has been folded.
FIG. 4 is a schematic plan view of a woven fabric blank suitable for folding into an improved absorbent product embodying the principles of the present inventive concept.

In FIG. 3, there is shown a cross-section of the individual woven blank of FIGS. 1 and 2, after it has been folded into an absorbent product, suitable for use as a diaper. End panels 38,38 and a central panel 39 are formed during the folding operation.

Consideration of FIG. 3 reveals that the more highly absorbent double-ply gauze fabric portions 32 and 33 form a total of four interior individual gauze fabric layers in the central panel 39. These are highly absorbent and are protected from the usual wear and tear by two outer protective layers of stronger, more abrasion resistant, longer wearing birdseye fabric. Each of the end panels 38,38 of the folded diaper comprises two layers of birdseye fabric material and are strong, wear and abrasion resistant, and possess long wearing qualities. As a result, the advantages and benefits of both types of weaves are realized in a single absorbent product without suffering their disadvantages and limitations.

The total width of the woven blank of FIGS. 1–3 is normally in the range of from about 38 inches to about 42 inches but preferably is in the range of from about 39 inches to about 41 inches, as woven.

The widths of the individual double-ply gauze fabric portions 32,33 vary widely, depending on the manner and form of the folding operation and the subsequent use of the absorbent product, but normally range from about 5 inches to about 7 inches. Other widths, both smaller and larger, are of use for particular purposes, applications, and uses.

The widths of the individual, centrally-located birdseye fabric portion 31 also vary widely, depending upon the manner of the folding operation and the subsequent use of the absorbent product, but normally range from about 24 inches to about 32 inches, and preferably from about 26 inches to about 30 inches. Other widths, both smaller or larger, are of use for particular purposes, applications and uses.

The final, folded absorbent diaper of FIGS. 1–3 and other diapers disclosed herein normally have a width of from about 13 inches to about 16 inches and a length of from about 20 inches to about 23 inches, all measurements naturally being taken at the conclusion of weaving, cutting and folding and prior to washing with its concomitant shrinking.

It is to be appreciated that conventional or other stitching, or other securing means, may be employed at various locations S to maintain the various layers and folds of the absorbent product properly in their folded position during use or during subsequent washing and cleaning operations. Although stitching is shown at the folded ends of the diaper, such is not essential and the stitching at the extreme right and left hand ends of the diaper of FIG. 3 may be omitted, if so desired.

WARP YARNS

The number of warp yarns per inch for the absorbent products 30 of FIGS. 1–3 and for all subsequent absorbent products disclosed hereinafter varies across the width of the woven blank 30, depending upon the particular width, ply, and weave of the fabric portions involved. In each double-ply gauze fabric portion 32,33, there is normally a total of from about 70 to about 150 warp yarns per inch, and preferably from about 80 to about 140 warp yarns per inch. These warp yarns are divided between the two individual gauze layers, each of which consequently contains from about 35 to about 75 warp yarns per inch and preferably from about 40 to about 70 warp yarns per inch.

The number of warp yarns in the individual single-ply birdseye fabric portion 31, is normally in the range of from about 40 to about 100 warp yarns per inch, and preferably from about 50 to about 90 warp yarns per inch.

The warp yarn sizes range from about 10/1 to about 40/1, and preferably from about 20/1 to about 30/1, cotton count. Such yarns are usually cotton. If other cellulosic yarns, or rayon, or other absorbent synthetic yarns are used, they are preferably spun and possess a size, denier and weight corresponding and equivalent to the cotton yarn sizes listed in this paragraph. Mixtures of such absorbent fibers in various proportions and blends may also be used.

FILLING YARNS

The number of filling yarns per inch for the absorbent product 30 of FIGS. 1–3 and for all subsequent absorbent products disclosed hereinafter varies widely and is normally in the range of from about 20 to about 75 filling yarns per inch, and preferably from about 25 to about 70 filling yarns per inch.

The filling yarn sizes range from about 10/1 to about 40/1, and preferably from about 15/1 to about 35/1. Such yarns are usually cotton. If other cellulosic yarns, or rayon, or other absorbent synthetic yarns are used, they are preferably spun and possess a size, denier and weight corresponding and equivalent to the cotton yarn sizes listed in this paragraph. Mixtures of such absorbent fibers in various proportions and blends may also be used.

The twist multiples of the warp yarns and the filling yarns in the absorbent product 30 of FIGS. 1-3 and in the subsequent absorbent products disclosed hereinafter are in the range of from about 3 to about 4.8, but preferably are in the range of from about 4 to about 4.8 (warp) and from about 3 to about 4 (filling).

Figure 5:
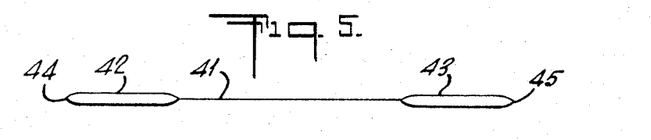
FIG. 5 is a schematic cross-sectional view of the woven fabric blank of FIG. 4, taken on the line 5—5 thereof.
Figure 6:
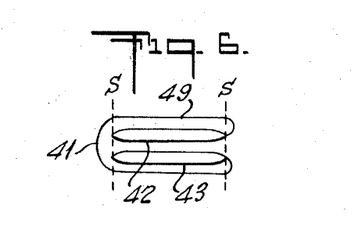
FIG. 6 is a schematic cross-sectional view of the woven fabric blank of FIG. 5, after it has been folded.

In FIGS. 4, 5 and 6, there is shown a woven fabric blank 40 comprising a centrally located, single-ply birdseye fabric portion 41, two double-ply gauze fabric portions 42 and 43 located at the sides of the woven blank 40, two conventional selvages 44 and 45 at the side edges of the woven blank 40, and two conventional pinking bar portions 46 and 47, extending across the width of the woven blank in the filling direction.

The widths of the birdseye portion 41 and the gauze portions 42,43 are different than those set forth in FIGS. 1-3 and are so selected that folding of the woven blank, as shown in FIG. 6, produces an absorbent product wherein there are four gauze interior layers extending the entire width of the folded absorbent product and completely covered by birdseye outer layers. There is basically only one panel 49 formed and the resulting product is especially suitable for use as a panty pad or as a baby panty insert.

The total width of the woven fabric blank 40 is normally in the range of from about 24 inches to about 40 inches, with the double ply gauze portions each measuring from about 6 inches to about 10 inches and with the single ply birdseye portion measuring from about 12 inches to about 20 inches. The resulting folded absorbent product measures from about 6 inches to about 10 inches in width. Lesser or greater widths are possible, depending on the subsequent use of the absorbent product.

The width of the finished folded panty pad of FIGS. 4-6 and other panty pads disclosed herein is normally in the range of from about 6 inches to about 10 inches, prior to washing. The length is normally in the range of from about 18 inches to about 22 inches, prior to washing.

Stitching S, or other securing means, is provided, as usual, to secure the several layers together and to keep them in proper relationship during use.

Figure 7:
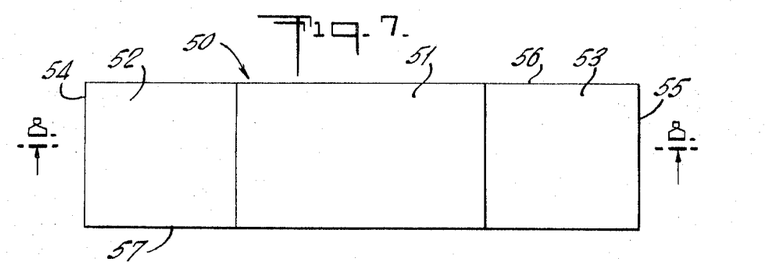
FIG. 7 is a schematic plan view of a woven fabric blank suitable for folding into an improved absorbent product embodying the principles of the present inventive concept.
Figure 8:
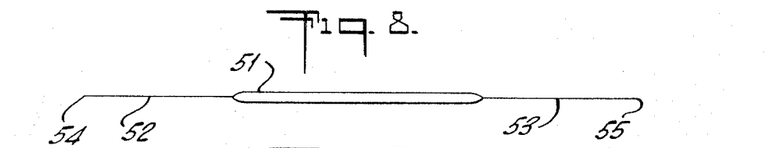
FIG. 8 is a schematic cross-sectional view of the woven fabric blank of FIG. 7, taken on the line 8—8 thereof.
Figure 9:
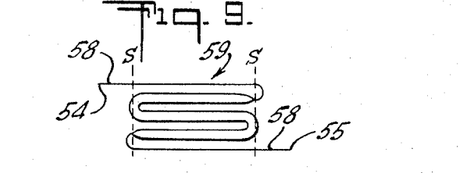
FIG. 9 is a schematic cross-sectional view of the woven fabric blank of FIG. 8, after it has been folded.

It is not essential that the single-ply birdseye fabric portion be centrally located and flanked on both sides by double-ply gauze fabric portions. In FIGS. 7, 8 and 9, there is shown a woven fabric blank 50 employing a reverse construction comprising a centrally located double-ply gauze fabric portion 51, two single-ply birdseye fabric portions 52 and 53 located at the sides of the woven fabric blank 50, two conventional selvages 54 and 55 at the side edges of the woven blank 50, and two conventional pinking bar portions 56 and 57 extending across the width of the woven fabric blank 50 in the filling direction.

The absorbent product 50 is folded as shown in FIG. 9 to form side panels 58,58 and a central panel 59. It is to be appreciated that the side panels 58 and 58 each comprise a single-ply birdseye fabric layer, whereas the centrally located panel 59 comprises outer layers of birdseye fabric and six internally located highly absorbent gauze fabric layers.

The total width of the woven blank, as initially fabricated, is in the range of from about 38 inches to about 42 inches but preferably is in the range of from about 39 inches to about 41 inches.

The width of each birdseye fabric portion 52,53 is in the range of from about 10 inches to about 12 inches and the width of the centrally located double ply gauze portion 51 is in the range of from about 14 inches to about 22 inches. The folded width of the finished absorbent product is therefore in the range of from about 13 inches to about 16 inches, prior to washing. The folded product is useful as a woven, reusable diaper.

Stitching S or other securing means may be used, as described previously, to hold the folds of the final absorbent product in proper relationship during use.

Figure 10:
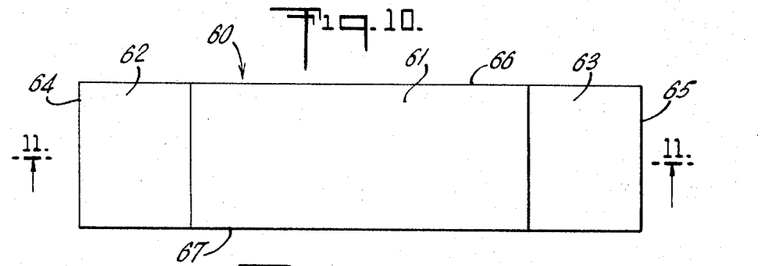
FIG. 10 is a schematic view of a woven fabric blank suitable for folding into an improved absorbent product embodying the principles of the present inventive concept.
Figure 11:
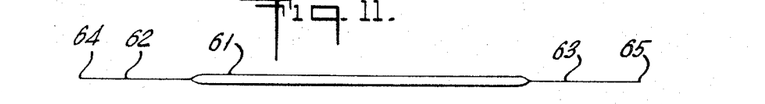
FIG. 11 is a schematic cross-sectional view of the woven fabric blank of FIG. 1, taken on the line 11—11 thereof.
Figure 12:
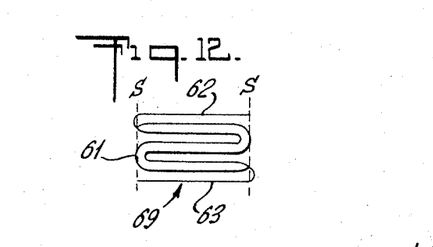
FIG. 12 is a schematic cross-sectional view of the woven fabric blank of FIG. 11, after it has been folded.

In FIGS. 10, 11 and 12, there is illustrated a woven fabric blank 60, comprising a centrally located double-ply gauze fabric portion 61, two single-ply birds-eye fabric portions 62 and 63 located at the sides of the woven fabric blank 60, two conventional selvages 64 and 65 located at the side edges of the woven blank 60, and two conventional pinking bar portions 66 and 67, extending across the width of the woven blank 60 in the filling direction.

The folding of the woven fabric blank 60 is illustrated in FIG. 12 and it is to be noted that a single panel 69 is formed and that it contains outer portions of birdseye fabric layers 62 and 73 and six internally located highly absorbent gauze fabric layers. The product is useful as a panty pad.

Stitching S or other securing means is used, as described previously, to hold the folds of the final absorbent product in proper relationship during use.

Figure 13:
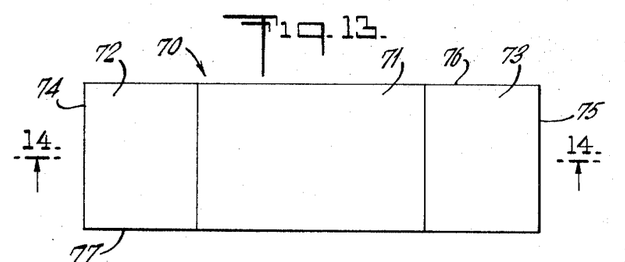
FIG. 13 is a schematic plan view of a woven fabric blank suitable for folding into an improved absorbent product embodying the principles of the present inventive concept.
Figure 14:
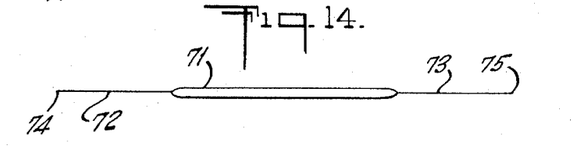
FIG. 14 is a schematic cross-sectional view of the woven fabric blank of FIG. 13, taken on the line 14—14 thereof.
Figure 15:
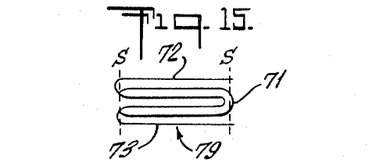
FIG. 15 is a schematic cross-sectional view of the woven fabric blank of FIG. 14, after it has been folded.

In FIGS. 13, 14 and 15, there is illustrated a woven fabric blank 70, comprising a centrally located double-ply gauze fabric portion 71, two single-ply birdseye fabric portions 72 and 73 located at the sides of the woven blank 70, two conventional selvages 74 and 75 located at the side edges of the woven blank 70, and two conventional pinking bars 76 and 77, extending across the width of the woven blank 70 in the filling direction.

The folding of the woven fabric blank 70 is illustrated in FIG. 15 and it is to be noted that a single panel 79 is formed and that it contains outer portions of single-ply birdseye fabric portions 72 and 73 and four internally located highly absorbent gauze fabric layers. The product is useful as a panty pad but may have less absorbency than the panty pad of FIGS. 10-12 because it has fewer internally located gauze fabric layers.

Stitching S or other securing means is used, is described previously to hold the folds of the final absorbent product in proper relationship during use.

Figure 16:
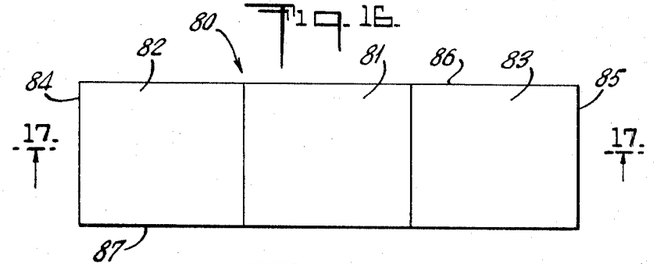
FIG. 16 is a schematic plan view of a woven fabric blank suitable for folding into an improved absorbent product embodying the principles of the present inventive concept.
Figure 17:
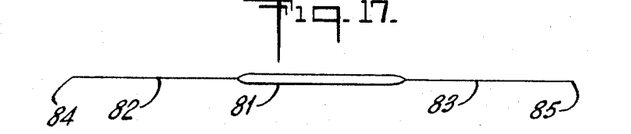
FIG. 17 is a schematic cross-sectional view of the woven fabric blank of FIG. 16, taken on the line 17—17 thereof.
Figure 18:
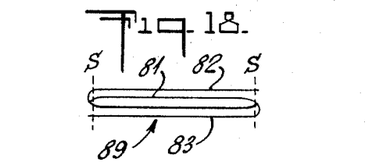
FIG. 18 is a schematic cross-sectional view of the woven fabric blank of FIG. 17, after it has been folded.

In FIGS. 16, 17 and 18, there is illustrated a woven fabric blank 80 comprising a centrally located double-ply gauze fabric portion 81, two single-ply birdseye fabric portions 82 and 83 located at the sides of the woven fabric blank 80, two conventional selvages 84 and 85 located at the side edges of the woven blank 80, and two conventional pinking bar portions 86 and 87, extending across the width of the woven blank 80 in the filling direction.

The folding of the woven blank 80 is illustrated in FIG. 18 and it is to be noted that a single panel 89 is formed and that it contains outer portions of single-ply birdseye fabric portions 82 and 83 and two internally located absorbent gauze fabric layers. The product is useful as a panty pad but may have less absorbency than the panty pad of FIGS. 13-15 because it has fewer internally located gauze fabric layers.

Stitching S or other securing means is used, as described previously, to hold the folds of the final absorbent product in proper relationship during use.

Figure 19:
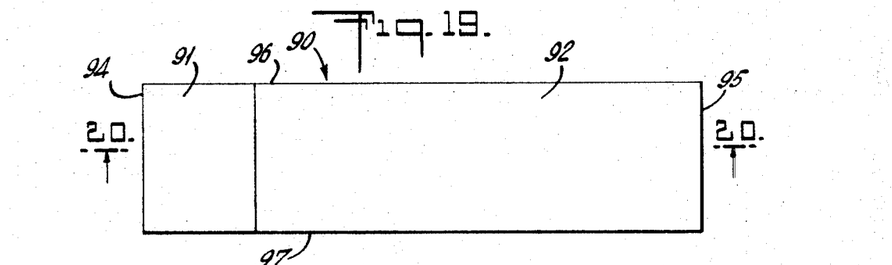
FIG. 19 is a schematic plan view of a woven fabric blank suitable for folding into an improved absorbent product embodying the principles of the present inventive concept.
Figure 20:
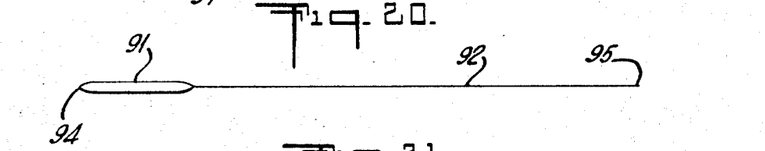
FIG. 20 is a schematic cross-sectional view of the woven fabric blank of FIG. 19, taken on the line 20—20 thereof.
Figure 21:
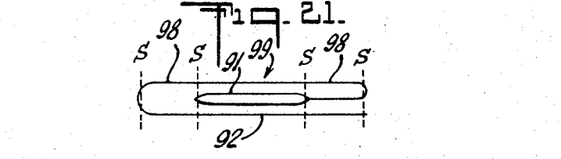
FIG. 21 is a schematic cross-sectional view of the woven fabric blank of FIG. 20, after it has been folded.

It is not necessary that there be a total of three separate sections in the woven fabric blank as originally integrally fabricated. FIGS. 19, 20, and 21 disclose a woven fabric blank 90 comprising one double-ply gauze fabric portion 91 located on one side of the woven fabric blank, one much wider single-ply birdseye fabric portion 92, two selvages 94 and 95 located at the side edges of the woven blank, and two pinking bar portions 96 and 97, extending across the width of the woven blank 90 in the filling direction.

The folding of the woven fabric blank is illustrated in FIG. 21 and it is to be noted that two side panels 98,98 and a central panel 99 are formed. In this modification, there are only two internally located absorbent gauze layers sandwiched between the outer protective layers of birdseye fabric portions. The product is useful as a diaper.

Stitching S or other securing means may be used, as described previously, to hold the folds of the final absorbent product in proper relationship during use. Again, the end stitching may be omitted, if so desired.

Figure 22:
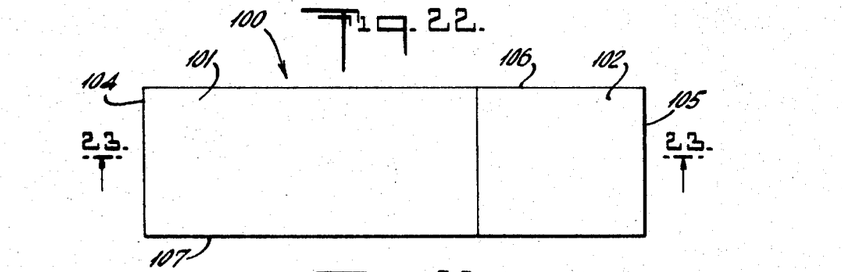
FIG. 22 is a schematic plan view of a woven fabric blank suitable for folding into an improved absorbent product embodying the principles of the present inventive concept.
Figure 23:
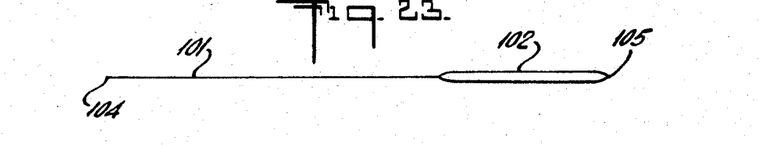
FIG. 23 is a schematic cross-sectional view of the woven fabric blank of FIG. 22, taken on the line 23—23 thereof.
Figure 24:
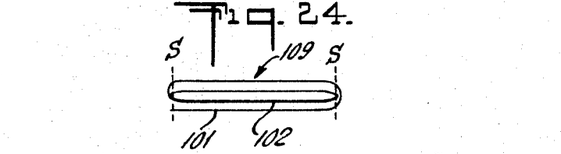
FIG. 24 is a schematic cross-sectional view of the woven fabric blank of FIG. 23, after it has been folded.

In FIGS. 22, 23 and 24, there is illustrated another modification wherein there are only two sections of the woven fabric blank, as originally fabricated. In these figures, there is disclosed a woven fabric blank 100, a single-ply birdseye fabric section 101, a relatively smaller double-ply gauze fabric section 102, two conventional selvages 104 and 105 located at the side edges of the woven blank 100, and two conventional pinking bar portions 106 and 107, extending across the width of the woven blank in the filling direction.

The folding of the woven fabric blank 100 is illustrated in FIG. 24 and it is to be noted that merely a single panel 109 is formed. The panel 109 comprises outer protective layers of birdseye fabric and two internally located layers of highly absorbent gauze fabric. The final product is adapted for use as a panty pad.

Stitching S or other securing means is used as described previously, to hold the folds of the final absorbent product in proper relationship during use.

Figure 25:
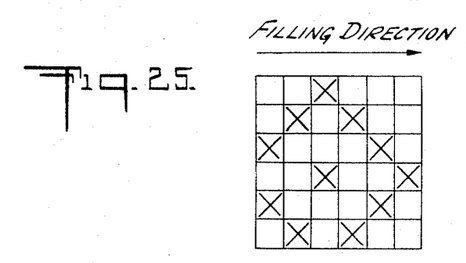
FIGS. 25–27 are schematic showings of three variations of typical birdseye fabric weave patterns.
Figure 26:
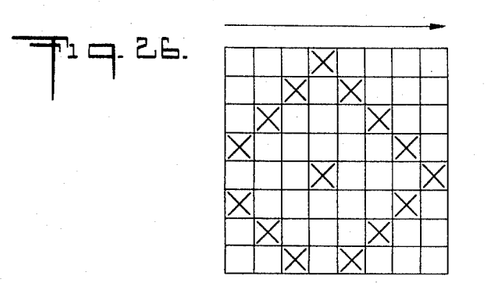
Figure 27:
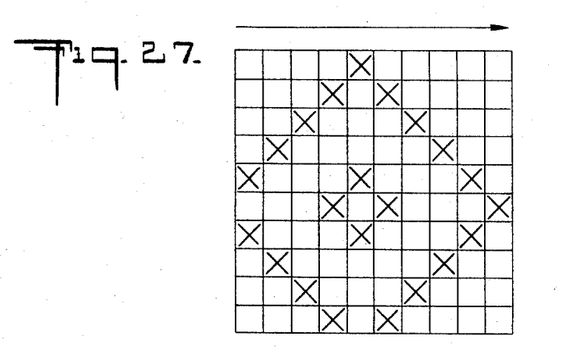

In FIGS. 25, 26 and 27, there are illustrated three typical birdseye weave patterns. An "X" in a particular box indicates that the warp yarn passes over the filling yarn at that particular location. The pattern of FIG. 25 has six warp yarns and six filling yarns in each repeat of the pattern. The pattern of FIG. 26 has eight warp yarns and eight filling yarns in each repeat of the pattern. The pattern of FIG. 27 has 10 warp yarns and 10 filling yarns in each repeat of the pattern. As used herein, "birdseye," "birdseye weave," and similar expressions are intended to mean not only the standard conventional diamond weave patterns with a small dot appearing in the center of each diamond, referred to generally as "birdseye" fabric, but also any other related fancy weave in which a visual or ornamental effect is created other than that of a plain weave, provided such other fancy weaves have excellent strength, excellent wear and abrasion resistance, and long wearing properties and characteristics. Such fabrics are normally made on dobby or cam looms.

Moreover, within the more generic aspects of the present invention, the broader concept thereof includes the use of (1) an outer layer of any single-ply, stronger, more wear and abrasion resistant fabric weave and (2) interior layers of any multi-ply, highly absorbent fabric weave. These layers are fabricated integrally at the same time in a single weaving operation and result in a plurality of connected, unitary, single woven blank structures. The cutting and folding of the woven blanks takes place in such a way that the highly absorbent, multi-layer fabric sections are folded inwardly to form a multiplicity of multi-ply internal fabric layers and the stronger, more abrasion resistant, and longer wearing single-ply sections are folded outwardly to form single-ply outer layers, completely covering and protecting the multiplicity of multi-ply internal fabric layers.

A specific embodiment of such a broader concept can be described more particularly with general reference to the fabric structure illustrated in FIGS. 1–3. The broader concept thus includes, for example, (1) a centrally located, single-ply, stronger, more abrasion resistant and longer wearing fabric weave (identified as 31 in FIGS. 1–3) and (2) two double-ply, more highly absorbent fabric weave portions (identified as 32, 33 in FIGS. 1–3) at the ends of and adjacent to the centrally located weave portion. The centrally located single-ply, stronger, more abrasion resistant and longer wearing fabric portion may be, for example, a gauze weave but must possess yarns of such a weight and must be woven, for example, with its warp yarns more closely together so as to supply the requisite strength, abrasion resistance, and longer wearing properties and characteristics. The outer weave portions may remain as described previously and possess yarns of such a weight and are woven, for example, with fewer warp yarns to thus be more open, so as to be more highly absorbent.

Figure 28:
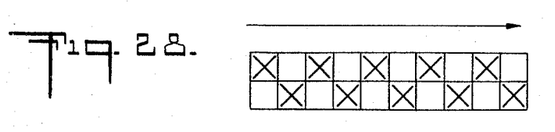
FIG. 28 is a schematic showing of one variation of a typical simple gauze weave pattern.

In FIG. 28, there is shown one very simple pattern of a typical gauze weave pattern. Again, an X in a box indicates that the warp yarn passes over the filling yarn at that particular location. Very many variations of this simple weave pattern are possible within the scope of the principles of the present inventive concept. Plain weaves and leno or doup weaves are, of course, included.

The invention will be further illustrated in greater detail by the following specific examples. It should be understood, however, that although these examples may describe in particular detail some of the more specific features of the invention, they are given primarily for purposes of illustration and the invention in its broader aspects is not to be construed as limited thereto.

EXAMPLE I

The absorbent diaper of FIGS. 1, 2 and 3 is made to the following specifications: the warp yarns are cotton 25's and there are 80 warp yarns per inch in the centrally located birdseye fabric portion and there are 60 warp yarns per inch in each layer of the two end double-ply gauze fabric layers. The filling yarns are also cotton 25's and there are 40 picks per inch. The birdseye weave pattern is an eight yarn repeat pattern, as illustrated in FIG. 26.

The width of each end gauze section, as woven, is 5-¾ inches and the width of the centrally located birdseye section, as woven, is 28 inches. The total width of the woven blank is 39-½ inches and its length is 22 inches, as woven. The woven fabric blank is cut from the woven length by cutting along the center line of the pinking bar portions. It is then folded and stitched to hold the folds and layers in proper relationship. The end stitching is omitted. The folded dimensions of the finished absorbent diaper, prior to washing, are: the end panels are 4-¼ inches each and the central panel is 6 inches; the total width is 14-½ inches; and the length is 22 inches.

There are four highly absorbent gauze fabric layers in the interior of the folded diaper and there are outer layers of birdseye fabric on each side thereof. The birdseye layers are stronger, more wear and abrasion resistant, and have longer wearing properties and characteristics. The diaper is highly acceptable to industry.

EXAMPLE II

The absorbent diaper of FIGS. 7, 8 and 9 is made to the following specifications: the warp yarns are cotton 25's and there are 60 warp yarns per inch in each of the end birdseye fabric sections and 45 warp yarns per inch in each of the centrally located double-ply gauze fabric sections. The filling yarns are 25's and there are 34 picks per inch. The birdseye weave pattern is an eight yarn repeat pattern as illustrated in FIG. 26.

The width of the end birdseye fabric section is 11 inches, as woven, and the width of the centrally located double-ply gauze fabric portion is 16 inches, as woven. The total width of the woven blank is 38 inches and its length is 22 inches, as woven.

The woven fabric blank is cut from the woven length by cutting along the center line of the pinking bar portions. It is then folded and stitched to hold the folds in proper relationship. The folded dimensions (prior to washing) are: each end panel is 4 inches and the central panel is 6-¼ inches. The total width is 14-½ and its length is 22 inches.

There are six highly absorbent gauze fabric layers in the interior of the folded diaper and there are outer layers of birdseye fabric on the outer sides thereof. The birdseye layers are stronger, more wear and abrasion resistant and have longer wearing properties and characteristics. The diaper is highly acceptable to industry.

EXAMPLE III

The procedures of Example II are followed substantially as set forth therein with the exception that the filling yarns are 15.25's and there are 34 picks per inch. The results are generally comparable.

EXAMPLE IV

The absorbent panty pad of FIGS. 4, 5 and 6 is made to the following specifications: the warp yarns are cotton 25's and there are 80 warp yarns per inch in the centrally located birdseye fabric section and there are 60 warp yarns per inch in each layer of the two end double-ply gauze fabric sections. The filling yarns are also cotton 25's and there are 40 picks per inch. The birdseye weave pattern is an eight yarn repeat pattern, as illustrated in FIG. 26.

The width of each double ply gauze section is 7-½ inches, as woven, and the width of the centrally located single-ply birdseye fabric section is 15-½ inches, as woven. The total width of the woven blank is 30-½ inches and its length is 20 inches, as woven. The woven blank is cut from the woven length by cutting along the center line of the pinking bar portions. It is then folded and stitched to hold the folds and layers in proper relationship. The dimensions of the folded single panel which is formed are: the width is 7-½ inches and the length is 20 inches, prior to washing.

There are four highly absorbent gauze layers in the interior of the panty pad and they are covered top and bottom by layers of single-ply birdseye fabric portions, which are stronger, are more wear- and abrasion-resistant, and have much longer wearing properties and characteristics. The panty pad is suitable for insertion in a baby panty and is highly acceptable to industry.

EXAMPLE V

The procedures of Example I are followed substantially as set forth therein with the exception that the birdseye weave pattern is a six warp yarn repeat pattern. The results are generally comparable to those obtained in Example I and the diaper is highly acceptable to industry.

Although several specific examples of the inventive concept have been described, the same should not be construed as limited thereby nor to the specific features mentioned therein but to include various other equivalent features as set forth in the claims appended hereto. It is understood that any suitable changes, modifications and variations may be made without departing from the spirit and scope of the invention.

What is claimed is:

1. An integrally woven, folded, reusable absorbent product comprising a plurality of interior layers and outer layers, said interior layers comprising two-ply, highly absorbent fabric layers extending throughout the warpwise length of the product and said outer layers comprising single-ply, strong, abrasion resistant, long wearing fabric layers also extending throughout the warpwise extent of the product, each ply of said interior layers having substantially fewer warp yarns per inch than are present in said single ply and having half the number of filler picks per inch present in said single-ply.

2. An integrally woven, folded, reusable absorbent product comprising a plurality of interior layers and outer layers, said interior layers comprising two-ply highly absorbent gauze fabric layers extending throughout the warpwise length of the product and said outer layers comprising single-ply, strong abrasion-resistant, long wearing birdseye fabric layers also extending throughout the warpwise extent of the product, each ply of said interior layers having substantially fewer warp yarns per inch than are present in said single ply and having half the number of filler picks per inch present in said single-ply.

3. A woven, folded, reusable absorbent product as defined in Claim 2 wherein the product comprises a central panel and two side panels and the gauze fabric layers are located substantially completely within the central panel.

4. A woven, folded, reusable absorbent product as defined in Claim 2 wherein there are two gauze layers.

5. A woven, folded, reusable absorbent product as defined in Claim 2 wherein there are four gauze layers.

6. A woven, folded, reusable absorbent product as defined in Claim 2 wherein there are six gauze layers.

7. A method of making folded, reusable absorbent products possessing excellent absorbency, along with excellent strength, excellent abrasion resistance, and long wearing properties which comprises:

forming a continuous fabric in a single weaving operation in which the fabric has, in side-by-side relation, at least one single-ply section having from 80–140 warp ends per inch and at least one double-ply section having from 40–70 warp ends per inch, the two sections having a common filler of from 25–70 picks per inch;

separating said fabric along its length into blanks for the product; and then folding said blanks in such a way that the product is formed wherein double-ply fabric is covered on opposite sides by single-ply fabric.

8. The method according to claim 7 wherein the ratio of the number of warp ends per inch in the single-ply section to the number of warp ends in the double-ply section is about eight-thirds.

9. The method according to claim 8 wherein the fabric is formed with three sections, a centrally extending single-ply section bounded on opposite sides by double-ply sections.

10. The method according to claim 8 wherein the fabric is formed with three sections, a centrally extending double-ply section bounded on opposite sides by single-ply sections.

11. The method according to claim 8 wherein the fabric is provided along its length with transverse picking bars along which the blanks are separated.

* * * * *

CERTIFICATE OF CORRECTION

Patent No. __3,747,601__   Dated __July 24, 1973__

Inventor(s) __Winston L. May, Jr.__

It is certified that error appears in the above-identified patent and that said Letters Patent are hereby corrected as shown below:

On the cover sheet insert between [72] and [22]

--[73]  Assignee:   Dundee Mills, Incorporated, Griffin, Ga. --

Signed and sealed this 16th day of July 1974.

(SEAL)
Attest:

McCOY M. GIBSON, JR.
Attesting Officer

C. MARSHALL DANN
Commissioner of Patents